US012785959B1

(12) United States Patent
Choi et al.

(10) Patent No.: US 12,785,959 B1
(45) Date of Patent: Nov. 3, 2026

(54) DISTRIBUTED DOMAIN AUTHORITY

(71) Applicant: Amazon Technologies, Inc., Seattle, WA (US)

(72) Inventors: Joon Hyuck Choi, Kirkland, WA (US); Petr Praus, Seattle, WA (US); Matthew J Campagna, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 39 days.

(21) Appl. No.: 18/935,267

(22) Filed: Nov. 1, 2024

(51) Int. Cl.
*H04L 9/14* (2006.01)
*H04L 9/32* (2006.01)

(52) U.S. Cl.
CPC .............. *H04L 9/14* (2013.01); *H04L 9/3263* (2013.01)

(58) Field of Classification Search
CPC ................................ H04L 9/14; H04L 9/3263
See application file for complete search history.

(56) References Cited

U.S. PATENT DOCUMENTS 7,234,063 B1 6/2007 Baugher et al.
7,290,133 B1 10/2007 Montgomery
8,046,579 B2 10/2011 Kresina
8,335,921 B2 12/2012 von Behren et al.
9,124,434 B2 9/2015 Krishnamurthy et al.
9,300,464 B1 3/2016 Roth
9,397,835 B1 7/2016 Campagna et al.
9,438,421 B1 9/2016 Roth et al.
9,537,650 B2 1/2017 Auradkar et al.
9,608,813 B1 3/2017 Roth et al.
9,660,970 B1 5/2017 Rubin et al.
9,866,392 B1 * 1/2018 Campagna ................ H04L 9/14
9,935,772 B1 4/2018 Madisetti et al.
9,942,211 B1 4/2018 Campagna
10,116,440 B1 10/2018 Rudzitis et al.
10,511,448 B1 12/2019 Brinskelle
10,644,890 B1 5/2020 Peddada et al.

(Continued)

FOREIGN PATENT DOCUMENTS

CN 121396496 A * 1/2026
WO WO-2012100352 A1 * 8/2012 ............. H04L 69/00

(Continued)

OTHER PUBLICATIONS

Machine translation of Zhou, WO 2021/184865 A1, pp. 1-4 (Year: 2021).*

(Continued)

*Primary Examiner* — Christopher A Revak
(74) *Attorney, Agent, or Firm* — Athorus, PLLC

(57) ABSTRACT

Disclosed are systems, methods, and apparatus to provide a distributed domain authority ("DA") for management of DA certificates, client host end-entity certificates, and DA key pairs for secure communication within a provider network. In accordance with the disclosed implementations, each of a plurality of hardware security modules ("HSM") performs the role of DA and issues end-entity certificates to individual HSMs and client hosts communicating with the HSMs. The private key of a DA key pair never leaves the HSM set in plaintext form and the DA key pair and its corresponding DA certificate are rotated periodically (e.g., daily, weekly) as part of a domain state rotation.

20 Claims, 12 Drawing Sheets

(56) References Cited

U.S. PATENT DOCUMENTS

| | | | | |
|---|---|---|---|---|
| 10,728,044 | B1 | 7/2020 | Melo et al. | |
| 10,749,689 | B1 | 8/2020 | Peddada et al. | |
| 10,771,261 | B1 | 9/2020 | Lazar et al. | |
| 10,778,429 | B1 * | 9/2020 | Rubin | H04L 9/0897 |
| 11,100,232 | B1 | 8/2021 | Juncker et al. | |
| 11,153,074 | B1 | 10/2021 | Nikitas et al. | |
| 11,316,701 | B1 | 4/2022 | Perez | |
| 11,323,274 | B1 | 5/2022 | Bowen et al. | |
| 11,394,544 | B2 | 7/2022 | Rastit | |
| 11,882,117 | B1 | 1/2024 | Kumar | |
| 11,888,997 | B1 | 1/2024 | Bowen et al. | |
| 11,943,350 | B2 | 3/2024 | Liu et al. | |
| 11,989,282 | B2 | 5/2024 | Liu et al. | |
| 12,015,721 | B1 | 6/2024 | Kumar | |
| 12,034,836 | B1 * | 7/2024 | Stapleton | H04L 9/0877 |
| 12,095,909 | B1 | 9/2024 | Campagna et al. | |
| 12,155,635 | B1 * | 11/2024 | Wan | H04L 67/02 |
| 12,184,793 | B2 | 12/2024 | Lambert et al. | |
| 12,200,122 | B1 | 1/2025 | Pala et al. | |
| 12,341,872 | B2 | 6/2025 | Daniel | |
| 12,438,733 | B2 | 10/2025 | Elemenshawy et al. | |
| 12,526,159 | B1 | 1/2026 | Slaughter et al. | |
| 2002/0038420 | A1 | 3/2002 | Collins et al. | |
| 2002/0144149 | A1 | 10/2002 | Hanna et al. | |
| 2003/0021417 | A1 | 1/2003 | Vasic et al. | |
| 2003/0035547 | A1 | 2/2003 | Newton | |
| 2003/0035548 | A1 | 2/2003 | Kwan | |
| 2003/0145203 | A1 | 7/2003 | Audebert et al. | |
| 2004/0103283 | A1 | 5/2004 | Hornak | |
| 2004/0168055 | A1 | 8/2004 | Lord et al. | |
| 2005/0071630 | A1 | 3/2005 | Thornton et al. | |
| 2005/0177749 | A1 | 8/2005 | Ovadia | |
| 2005/0240779 | A1 | 10/2005 | Aull et al. | |
| 2005/0246771 | A1 | 11/2005 | Hunt et al. | |
| 2005/0262345 | A1 | 11/2005 | Moreau | |
| 2005/0278534 | A1 | 12/2005 | Nadalin et al. | |
| 2006/0048228 | A1 | 3/2006 | Takemori et al. | |
| 2006/0143695 | A1 | 6/2006 | Grynberg | |
| 2007/0116269 | A1 | 5/2007 | Nochta | |
| 2007/0234432 | A1 * | 10/2007 | Korkishko | H04L 63/0492 726/27 |
| 2008/0010449 | A1 | 1/2008 | Holtzman et al. | |
| 2008/0010450 | A1 | 1/2008 | Holtzman et al. | |
| 2008/0010451 | A1 | 1/2008 | Holtzman et al. | |
| 2008/0010452 | A1 | 1/2008 | Holtzman et al. | |
| 2008/0010455 | A1 | 1/2008 | Holtzman et al. | |
| 2008/0010458 | A1 | 1/2008 | Holtzman et al. | |
| 2008/0022374 | A1 | 1/2008 | Brown et al. | |
| 2008/0034440 | A1 | 2/2008 | Holtzman et al. | |
| 2008/0126794 | A1 | 5/2008 | Wang et al. | |
| 2008/0134309 | A1 | 6/2008 | Qin et al. | |
| 2008/0313468 | A1 * | 12/2008 | Yoshikawa | H04L 63/0428 713/182 |
| 2009/0022311 | A1 | 1/2009 | Vanstone et al. | |
| 2009/0228703 | A1 | 9/2009 | Grajek et al. | |
| 2010/0257358 | A1 | 10/2010 | Grajek et al. | |
| 2010/0290622 | A1 | 11/2010 | Garcia Morchon et al. | |
| 2010/0313248 | A1 * | 12/2010 | Krivosheev | H04L 9/3226 726/5 |
| 2011/0055575 | A1 | 3/2011 | Gabryjelski et al. | |
| 2011/0119747 | A1 | 5/2011 | Lambiase | |
| 2012/0023326 | A1 | 1/2012 | Kalan et al. | |
| 2012/0204032 | A1 | 8/2012 | Wilkins et al. | |
| 2012/0257751 | A1 | 10/2012 | Everett | |
| 2012/0266231 | A1 | 10/2012 | Spiers et al. | |
| 2014/0013110 | A1 | 1/2014 | Thoniel et al. | |
| 2014/0136838 | A1 | 5/2014 | Mossbarger | |
| 2014/0164776 | A1 | 6/2014 | Hook et al. | |
| 2015/0121078 | A1 | 4/2015 | Fu et al. | |
| 2015/0222604 | A1 | 8/2015 | Ylonen | |
| 2015/0324791 | A1 | 11/2015 | Khan | |
| 2015/0326399 | A1 | 11/2015 | Nigriny et al. | |
| 2015/0372994 | A1 | 12/2015 | Stuntebeck | |
| 2016/0028551 | A1 | 1/2016 | Hussain et al. | |
| 2016/0036587 | A1 | 2/2016 | Hans et al. | |
| 2016/0057133 | A1 | 2/2016 | Ashley et al. | |
| 2016/0094543 | A1 | 3/2016 | Innes et al. | |
| 2016/0294564 | A1 | 10/2016 | Mock | |
| 2016/0316373 | A1 | 10/2016 | Gupta et al. | |
| 2016/0344727 | A1 | 11/2016 | Brockhaus et al. | |
| 2017/0005805 | A1 | 1/2017 | Wang et al. | |
| 2017/0026177 | A1 | 1/2017 | Pilcher | |
| 2017/0054566 | A1 | 2/2017 | Nitschke | |
| 2017/0063815 | A1 | 3/2017 | Smith et al. | |
| 2017/0213212 | A1 | 7/2017 | Dicker et al. | |
| 2017/0264596 | A1 | 9/2017 | Maydanik et al. | |
| 2017/0295132 | A1 | 10/2017 | Li et al. | |
| 2017/0331802 | A1 | 11/2017 | Keshava et al. | |
| 2017/0339130 | A1 | 11/2017 | Reddy et al. | |
| 2017/0353435 | A1 | 12/2017 | Pritikin et al. | |
| 2018/0004953 | A1 | 1/2018 | Smith, II et al. | |
| 2018/0034646 | A1 * | 2/2018 | Kuramoto | H04L 9/3268 |
| 2018/0041336 | A1 | 2/2018 | Keshava et al. | |
| 2018/0041467 | A1 | 2/2018 | Vats et al. | |
| 2018/0176240 | A1 | 6/2018 | Kopp et al. | |
| 2018/0198628 | A1 | 7/2018 | Hojsik et al. | |
| 2018/0232725 | A1 * | 8/2018 | Dooley | G06Q 20/36 |
| 2018/0234256 | A1 | 8/2018 | Bowen | |
| 2018/0262341 | A1 | 9/2018 | Cheng et al. | |
| 2018/0287802 | A1 | 10/2018 | Brickell | |
| 2018/0316676 | A1 | 11/2018 | Gilpin et al. | |
| 2018/0332011 | A1 | 11/2018 | Gray | |
| 2018/0351941 | A1 | 12/2018 | Chhabra | |
| 2018/0374072 | A1 | 12/2018 | Zhao et al. | |
| 2019/0028281 | A1 | 1/2019 | Turissini et al. | |
| 2019/0044709 | A1 | 2/2019 | Fontana et al. | |
| 2019/0123901 | A1 | 4/2019 | Vijayanarayanan | |
| 2019/0138294 | A1 | 5/2019 | Smith et al. | |
| 2019/0156043 | A1 | 5/2019 | Chhabra et al. | |
| 2019/0165950 | A1 | 5/2019 | Ibrahim | |
| 2019/0207912 | A1 | 7/2019 | Nielson et al. | |
| 2019/0245704 | A1 | 8/2019 | Pala | |
| 2019/0313246 | A1 | 10/2019 | Nix | |
| 2019/0392424 | A1 | 12/2019 | Wilson et al. | |
| 2020/0021446 | A1 | 1/2020 | Roennow et al. | |
| 2020/0052905 | A1 | 2/2020 | Mathias et al. | |
| 2020/0059372 | A1 | 2/2020 | Goeringer et al. | |
| 2020/0097661 | A1 | 3/2020 | Block et al. | |
| 2020/0099532 | A1 | 3/2020 | Goldman et al. | |
| 2020/0099536 | A1 | 3/2020 | Block et al. | |
| 2020/0099658 | A1 | 3/2020 | Couillard et al. | |
| 2020/0110813 | A1 | 4/2020 | Kamijoh | |
| 2020/0159940 | A1 | 5/2020 | Werner et al. | |
| 2020/0178080 | A1 | 6/2020 | Yasaki et al. | |
| 2020/0213306 | A1 | 7/2020 | Thomsen et al. | |
| 2020/0266983 | A1 | 8/2020 | Medvinsky et al. | |
| 2020/0266997 | A1 | 8/2020 | Monica et al. | |
| 2020/0274708 | A1 | 8/2020 | Vijayanarayanan | |
| 2020/0311228 | A1 | 10/2020 | Fontana et al. | |
| 2020/0358751 | A1 | 11/2020 | Bansal et al. | |
| 2020/0403809 | A1 | 12/2020 | Chan et al. | |
| 2021/0111875 | A1 | 4/2021 | Saint | |
| 2021/0136106 | A1 | 5/2021 | Balasubramaniam | |
| 2021/0144004 | A1 | 5/2021 | Gray et al. | |
| 2021/0152545 | A1 | 5/2021 | Park et al. | |
| 2021/0194679 | A1 | 6/2021 | Yang et al. | |
| 2021/0211308 | A1 | 7/2021 | Veladanda et al. | |
| 2021/0288804 | A1 | 9/2021 | Kassner et al. | |
| 2021/0288820 | A1 | 9/2021 | Barbe et al. | |
| 2021/0314148 | A1 | 10/2021 | Yang et al. | |
| 2021/0334084 | A1 | 10/2021 | Vessels | |
| 2021/0344511 | A1 | 11/2021 | Devarajan et al. | |
| 2021/0352132 | A1 | 11/2021 | Nix | |
| 2021/0385085 | A1 | 12/2021 | Wang et al. | |
| 2022/0020003 | A1 | 1/2022 | Sarkar | |
| 2022/0029803 | A1 | 1/2022 | Vijayanarayanan | |
| 2022/0030431 | A1 | 1/2022 | Peylo et al. | |
| 2022/0038478 | A1 | 2/2022 | Boudguiga et al. | |
| 2022/0043914 | A1 | 2/2022 | Edwards et al. | |
| 2022/0060335 | A1 | 2/2022 | Pinedo Hoyvik et al. | |
| 2022/0086009 | A1 | 3/2022 | Vacek et al. | |
| 2022/0139546 | A1 | 5/2022 | Manjunath et al. | |
| 2022/0141026 | A1 | 5/2022 | Smith et al. | |
| 2022/0141039 | A1 | 5/2022 | Gray et al. | |

(56) References Cited

U.S. PATENT DOCUMENTS

| | | | |
|---|---|---|---|
| 2022/0158846 | A1 | 5/2022 | Ray et al. |
| 2022/0182244 | A1 | 6/2022 | Falk et al. |
| 2022/0182246 | A1 | 6/2022 | Murphy et al. |
| 2022/0191012 | A1 | 6/2022 | Gu et al. |
| 2022/0207524 | A1* | 6/2022 | Geusz .................. G06Q 20/227 |
| 2022/0210146 | A1 | 6/2022 | Dhanabalan et al. |
| 2022/0255931 | A1 | 8/2022 | Avetisov et al. |
| 2022/0279023 | A1 | 9/2022 | Solari et al. |
| 2022/0329442 | A1 | 10/2022 | Bulusu et al. |
| 2022/0417036 | A1 | 12/2022 | Donlan et al. |
| 2023/0029025 | A1 | 1/2023 | Lee et al. |
| 2023/0030501 | A1 | 2/2023 | Cho et al. |
| 2023/0091686 | A1 | 3/2023 | Nakaike et al. |
| 2023/0179409 | A1 | 6/2023 | Camenisch et al. |
| 2023/0216662 | A1 | 7/2023 | Chan et al. |
| 2023/0246819 | A1 | 8/2023 | Schumann, III et al. |
| 2023/0247003 | A1 | 8/2023 | Chanak et al. |
| 2023/0291567 | A1 | 9/2023 | Krishnan et al. |
| 2023/0308293 | A1 | 9/2023 | Pergament et al. |
| 2023/0327886 | A1 | 10/2023 | Shin |
| 2023/0344646 | A1 | 10/2023 | Mackenbach et al. |
| 2023/0412397 | A1 | 12/2023 | Gollent et al. |
| 2024/0031173 | A1 | 1/2024 | Khatri et al. |
| 2024/0095328 | A1 | 3/2024 | Ponsini et al. |
| 2024/0121110 | A1 | 4/2024 | Shin |
| 2024/0129138 | A1 | 4/2024 | Noce et al. |
| 2024/0129139 | A1 | 4/2024 | Dietrich et al. |
| 2024/0205198 | A1 | 6/2024 | Sood et al. |
| 2024/0273411 | A1 | 8/2024 | Mueck et al. |
| 2024/0333470 | A1 | 10/2024 | Dutta et al. |
| 2024/0406011 | A1 | 12/2024 | Qiu et al. |
| 2024/0419770 | A1 | 12/2024 | Benkley, III et al. |
| 2024/0419774 | A1 | 12/2024 | Stelling et al. |
| 2025/0062917 | A1 | 2/2025 | Cho et al. |
| 2025/0337599 | A1 | 10/2025 | Small et al. |
| 2026/0012337 | A1 | 1/2026 | Stapleton et al. |
| 2026/0032003 | A1 | 1/2026 | Kwon et al. |
| 2026/0088980 | A1 | 3/2026 | Reynold |
| 2026/0100849 | A1 | 4/2026 | Ghiglino et al. |
| 2026/0113205 | A1 | 4/2026 | Chengalroyen et al. |

FOREIGN PATENT DOCUMENTS

| | | | |
|---|---|---|---|
| WO | WO-2021184865 A1 * | 9/2021 | ........... H04L 9/3213 |
| WO | WO-2023288037 A1 * | 1/2023 | .............. H04W 4/50 |

OTHER PUBLICATIONS

Machine translation of Pan, CN 121396496 A, pp. 1-2 (Year: 2026).*

International Search Report and Written Opinion mailed Sep. 23, 2022, Patent Application No. PCT/US2022/033074, 17 pages.

Han, J., et al "Scalable and Secure Virtualization of HSM with ScaleTrust," IEEE, pp. 1595-1610 (Year: 2022).

Hupp, W., et al "Module-OT: A Hardware Security Module for Operational Technology," pp. 1-6, (Year: 2020).

* cited by examiner

DISTRIBUTED DOMAIN AUTHORITY

BACKGROUND

Domain authority systems typically employ a hierarchical structure to manage and authenticate client hosts within an internal network. At the top of this hierarchy sits the domain controller, which acts as the central authority for the entire domain. The domain controller maintains a database of accounts and security policies within the domain. The domain controller is responsible for secure and efficient communication within the domain.

Communication between the domain authority and clients occurs through a series of well-defined protocols and processes. When a client host joins the domain, it establishes a trust relationship with the domain controller. Subsequent interactions, such as resource access requests, involve the client sending authentication requests to the domain controller. The controller verifies the credentials, issues time-limited tickets for authorized actions, and manages access control based on group policies and security settings.

BRIEF DESCRIPTION OF DRAWINGS

Various examples in accordance with the present disclosure will be described with reference to the drawings, in which.

DETAILED DESCRIPTION

Figure 1:
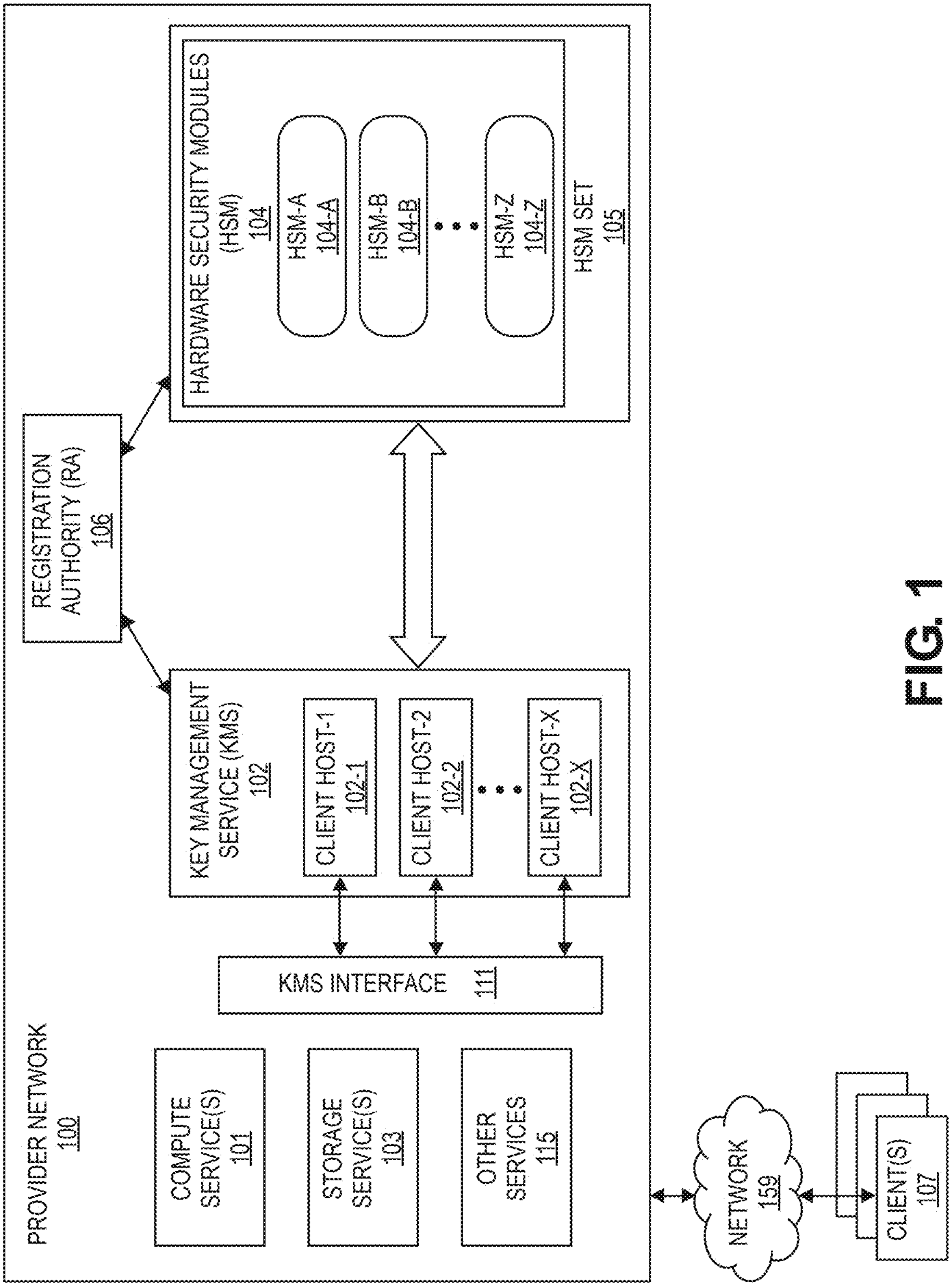
FIG. 1 is a block diagram illustrating an example configuration of a key management service, registration authority, and hardware security modules of a provider network, in accordance with implementations of the present disclosure.

Disclosed are systems, methods, and apparatus to provide a distributed domain authority ("DA") for management of DA certificates, client host end-entity certificates, and DA key pairs for secure communication within a provider network. As discussed further below, an example provider network includes a key management service ("KMS"), which is a managed service within the provider network that communicates with external clients/users and provides those external clients/users the ability to create and control encryption keys used to encrypt data. KMS may be integrated with other services of the provider network, thereby enabling data encryption of external client/user data stored or managed by those other services and control access keys to decrypt that data. To ensure the security of the encryption and keys, the KMS communicates with hardware security modules ("HSMs") of an HSM set. HSMs are physical computing devices that safeguard and manage digital keys for strong authentication and provide cryptoprocessing. HSMs may be in the form of a plug-in card, an external device that attaches directly to a computer or network server of the provider network, etc. HSMs provide tamper-evident and intrusion-resistant protection for cryptographic keys. An HSM set, as used herein, includes two or more HSMs. In some implementations, an HSM may only correspond to one HSM set. In other implementations, an HSM may correspond to multiple HSM sets, HSM sets may overlap, intersect, and/or there may be one or more HSM subsets within an HSM set.

The disclosed implementations may utilize any of a variety of security protocols for the communications discussed herein. For example, the disclosed implementations may utilize the transport layer security ("TLS") protocol, which is a cryptographic protocol that provides secure communication over networks by encrypting data and authenticating the communicating devices/entities. TLS works by establishing a secure channel between devices through a handshake process, where they agree on encryption algorithms and exchange keys. Once established, TLS ensures that all data transmitted between the devices is encrypted and protected from eavesdropping, tampering, etc.

In accordance with the disclosed implementations, each HSM performs the role of DA and issues end-entity certificates to individual HSMs and client hosts of the KMS. The private key of a DA key pair never leaves the HSM set in plaintext form and the DA key pair and its corresponding DA certificate are rotated periodically (e.g., daily, weekly) as part of a domain state rotation.

To facilitate communication between the KMS and the HSM, a domain trust issued by the DA operating on an HSM to different entities on the KMS includes a plurality of DA certificates, each certificate assigned to a different state. For example, an outgoing DA certificate (DA_cert_N−1) may be assigned to a deactivated state (referred to herein as a deactivated DA certificate), a current DA certificate (DA_cert_N) may be assigned to an active state (referred to herein as an active DA certificate), and a new DA certificate (DA_cert_N+1) may be assigned to a pending state (referred to herein as a pending DA certificate). As discussed below, a signed certificate, such as a signed client host end-entity certificate that is signed with a private key that signed any of the DA certificates included in the domain trust may be verified by the DA operating on any of the HSMs. In comparison, new certificates are only signed with the private key corresponding to the active DA certificate.

As clients of the domain receive an updated domain trust, the client generates a new client end-entity key pair, such as asymmetric keys that include a client end-entity public key and a client end-entity private key. Additionally, the client contacts a DA executing on one of the HSMs and obtains a new end-entity certificate signed with the DA private key corresponding to the active DA certificate included in the domain trust. By maintaining a plurality of DA certificates in the domain trust, end-entity certificates may be validated even if those certificates are signed with a private key corresponding to an outgoing DA certificate (e.g., a deactivated DA certificate). Likewise, as discussed further below, with the disclosed implementations, renewal of existing end-entity certificates with a domain state rotation can be done directly with the DA executing on an HSM, without the end-entity having to go through a registration authority ("RA").

FIG. 1 is a block diagram illustrating an example configuration of a key management service ("KMS") 102, registration authority ("RA") 106, and hardware security modules ("HSM") 104 maintained within a hardware security module set 105 of a provider network 100, in accordance with implementations of the present disclosure.

The KMS 102 is a managed service within the provider network 100 that communicates with external clients/users, referred to herein as clients 107, and provides those external clients/users the ability to create and control encryption keys used to encrypt data. KMS may be integrated with other services of the provider network 100, such as compute service(s) 101, storage service(s) 103, and other services 115, thereby enabling data encryption of external client/user data stored or managed by those services 101, 103, 115 and control access keys to decrypt that data. Compute service(s) 101, storage service(s) 103, other services 115, and clients 107 communicate with client hosts 102-1, 102-2, through 102-X of the KMS 102 through a KMS interface 111. The KMS 102 may include any number of client hosts 102-1 through 102-X and the KMS interface 111 may facilitate communication and load balancing among those client hosts 102-1 through 102-X.

To ensure the security of the encryption and keys, the KMS communicates with HSMs 104 that are maintained within an HSM set 105. Each HSM 104-A, 104-B through 104-Z is a physical computing device that safeguards and manages digital keys for strong authentication and provide cryptoprocessing. HSMs 104 may be in the form of a plug-in card, an external device that attaches directly to a computer or network server of the provider network, etc. The HSM set 105 separates the HSMs from other aspects of the provider network 100 and HSMs provide tamper-evident and intrusion-resistant protection for cryptographic keys.

When a client 107, which may communicate with the provider network 100 through a network 159, such as the Internet, requests a key from KMS 102, KMS sends the request to an HSM 104 and the HSM generates the key material within the HSM set 105. The key material never leaves the HSM set 105 in plaintext form. Likewise, when KMS 102 needs to perform an encryption or decryption operation, the operation request is sent to an HSM 104. The HSM performs the operation using the stored key for that operation and returns the result.

In accordance with the disclosed implementations, to ensure secure communication between the KMS 102 and the HSM 104, each HSM 104-A, 104-B through 104-Z performs the role of domain authority for a domain on which the KMS client hosts 102-1, 102-2, through 102-X communicate with HSMs 104-A, 104-B, through 104-Z, thereby providing a distributed DA. Each HSM 104-A through 104-Z issues end-entity certificates to individual HSMs and client hosts of the KMS. The private key of a DA key pair never leaves the HSM set in plaintext form and the DA key pair and its corresponding DA certificate are rotated periodically (e.g., daily, weekly) as part of a domain state rotation.

As discussed further below, a device of the KMS 102, such as a client host, may be configured to send a notification to a first HSM of the plurality of HSM notifying the HSM that the domain state needs to be rotated. For example, a client host of the KMS may send a DA key rotation notification. The first HSM, in response to the notification may create a new asymmetric key pair that includes a DA private key and a DA public key. The first HSM may also generate a new self-signed DA certificate that includes the DA public key and is back/signed with the DA private key and set the new DA certificate to a pending state. Further, the first HSM may set the state of a prior version of the DA certificate that was created and distributed as a result of a previous iteration of changing the domain state to an active state. Likewise, the DA certificate that was previously set to the active state may be assigned to a deactivated state. The first HSM may then generate a domain token that includes a domain state containing the newly created DA private key (referred to herein as a pending DA private key), the DA private key corresponding to the active DA certificate (referred to herein as the active DA private key), and the DA private key corresponding to the deactivated DA certificate (referred to herein as the deactivated DA private key), each DA private key encrypted with a domain key encryption key ("DKEK") that is known to each HSM 104-A, 104-B, through 104 -Z. The created domain token also includes a domain trust that contains the new pending DA certificate, the active DA certificate, and the deactivated DA certificate. Finally, the first HSM returns the domain token to the device of the KMS that sent the notification as responsive to the notification.

The device of the KMS, upon receipt of the domain token, sends the domain token to each of the HSMs within the HSM set. Each of the HSMs, upon receipt of the domain token, updates the state of the domain and begins using the active DA certificate and corresponding active DA private key to issue new end-entity certificates. Comparatively, requests signed with a DA private key corresponding to any of the DA certificates in the domain trust, such as the deactivated DA certificate, the active DA certificate, and the pending DA certificate, may be verified.

The HSMs, or the device of the KMS that received the domain token (or another device/service) may also publish the new domain trust. As client hosts receive the published new domain trust indicating the new states for the DA certificates, each client host may contact an HSM and request an updated signed client host end-entity certificate. As discussed below, because the disclosed implementations maintain multiple DA certificates in the domain trust, a request from the client hosts for an updated signed client host end-entity certificate may include the client host's current client host end-entity certificate, signed by a DA private key corresponding to one of the DA certificates maintained in the domain trust-such as a deactivated DA certificate. As such, the client host end-entity certificate can be renewed directly from the HSM without the client host having to go through the RA 106.

The RA 106 may be used to register a new client host of the KMS 102 into the domain. As discussed below, a new client host may initially contact the RA 106, for example by submitting a certificate signing request ("CSR"). The RA may verify the client host and then request and obtain a signed certificate for the new client host. Subsequently, after the new client host is added to the domain, the client host can renew its certificate directly with an HSM 104 operating as a DA for the domain, rather than having to go through the RA 106. Also, as discussed further below, because the HSMs are able to self-sign DA certificates, a new or rebooted HSM can await receipt of a domain token and then following the same process as other HSMs, decrypting the DKEK encrypted DA private key(s), generating new HSM end-entity key pairs signed with one of the DA private keys, and function as a DA.

Figure 2A:
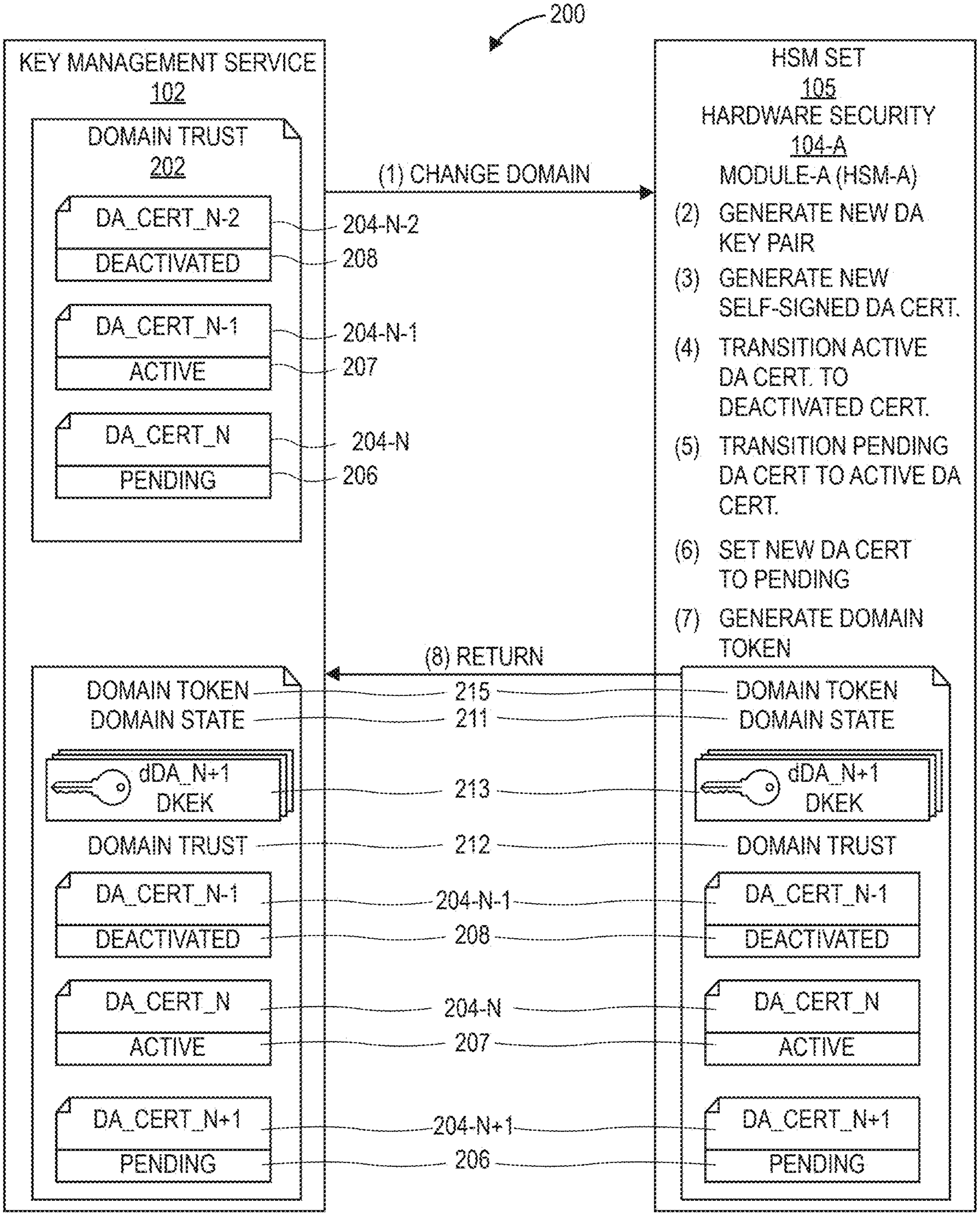
FIGS. 2A and 2B illustrate an example transition between a key management service and a plurality of hardware security modules operating as a hardware security module set to update a domain state of a domain managed by a distributed domain authority, in accordance with implementations of the present disclosure.
Figure 2B:
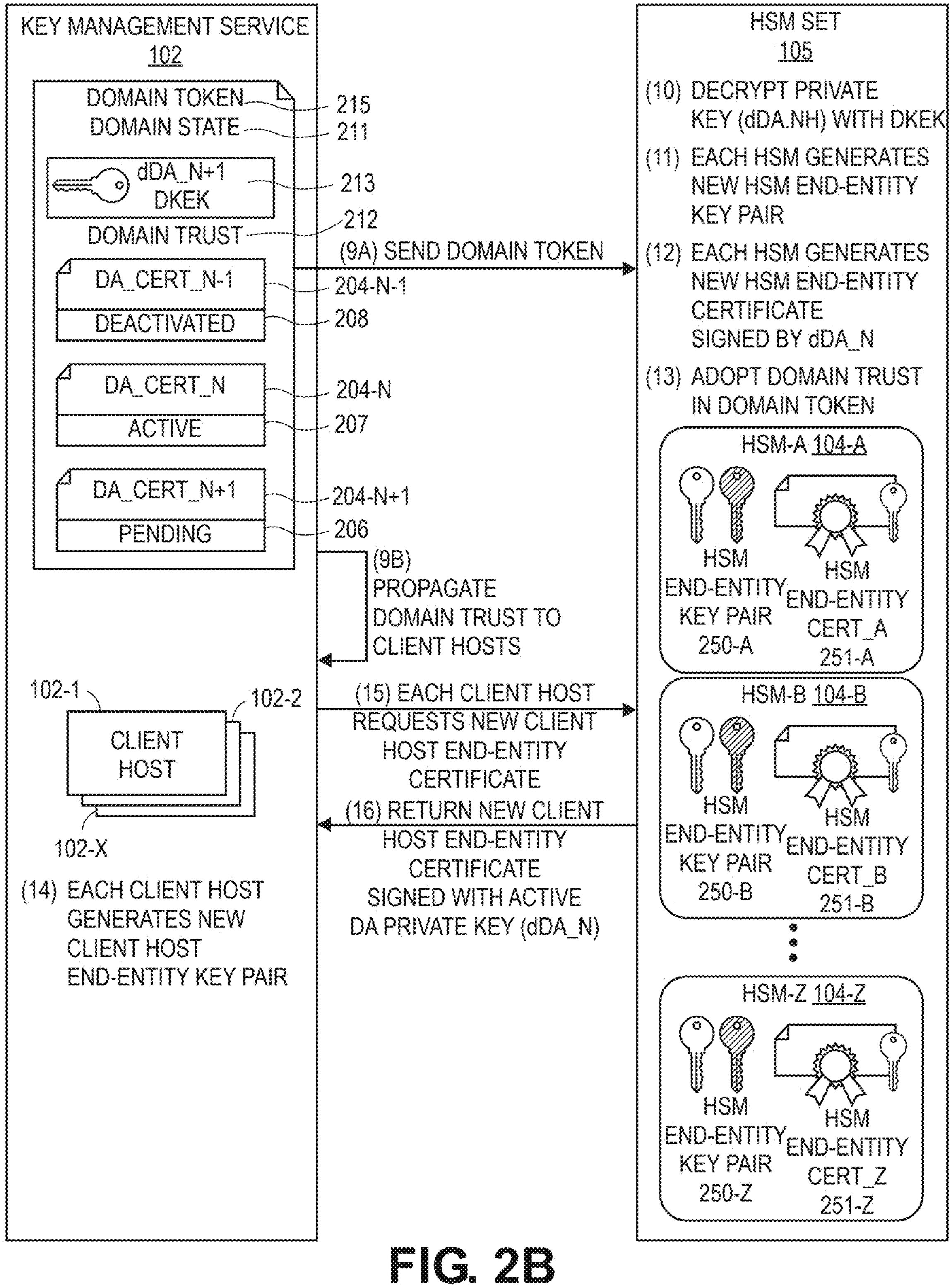

FIGS. 2A and 2B illustrate an example transition 200 between a KMS 102 and a plurality of HSMs 104-A, 104-B, through 104-Z operating within an HSM set 105 to update a domain state of a domain managed by the distributed DA operating on the HSMs, in accordance with implementations of the present disclosure.

The KMS 102, or a device or service operating on the KMS, such as a coordinator client host, may periodically send a request at (1) to an HSM of the plurality of HSMs requesting that the HSM change the domain. The request may be sent periodically, such as daily, weekly, etc. In other implementations, the request may be sent according to any recurring schedule, randomly, and/or in response to an event.

In this example, the change domain request is received by HSM-A 104-A of the plurality of HSMs. However, it will be appreciated that the change domain request may be received and executed upon, as described herein, by any of the HSMs of the plurality of HSMs.

The HSM-A 104-A, in response to receipt of the domain change request, at (2), generates a new DA cryptographic key pair, referred to herein as a DA key pair. For example, the DA key pair may be an asymmetric key pair that includes a public key and a corresponding private key. The HSM-A 104-A, at (3), may then generate a new self-signed DA certificate that includes the new DA public key and signed by the HSM-A 104-A with the corresponding new DA private key. Referring to FIG. 2A, and as discussed further below, the new DA private key is indicated as dDA_N+1 213 and the new DA certificate that includes the new DA public key and signed by the DA private key is referenced as DA_CERT_N+1 204-N+1.

In addition to generating a new DA key pair and a new DA certificate, DA_CERT_N+1 204-N+1, the HSM-A 104-A may update the state of existing DA certificates maintained in the domain trust 202 to produce an updated domain trust 212. For example, at (4), the existing domain certificate DA_CERT_N−1 204-N−1 may be transitioned from the active state 207, as illustrated in domain trust 202, to the deactivated state 208, as illustrated in updated domain trust 212. As a result, the previous DA certificate (DA_CERT_N−2) 204-N−2 is moved out of the domain trust. Likewise, at (5), the DA certificate (DA_CERT_N) 204-N is transitioned from the pending state 206, as illustrated in domain trust 202, to the active state 207, as illustrated in the updated domain trust 212. Finally, at (6), the new DA certificate (DA_CERT_N+1) 204-N+1 is assigned to the pending state 206, as illustrated in the updated domain trust 212.

The HSM-A 104-A, at (7), then generates a domain token 215 that includes a domain state 211 and the updated domain trust 212. The domain state 211 contains the newly generated DA private key (dDA_N+1) 213 and each of the other DA private keys corresponding to DA certificates of the updated domain trust 212, each DA private key encrypted with a DKEK that is known to each of the plurality of HSMs maintained within the HSM set 105. The updated domain trust 212 contains, in this example, the three different DA certificates 204-N−1, 204-N, and 204-N+1 and indications of their corresponding states (deactivated, active, pending). While the examples discussed herein describe a domain trust maintaining three DA certificates, each assigned to a different state, in other implementations the domain trust may contain additional or fewer DA certificates. Still further, in other implementations, there may be additional, fewer, and/or different DA certificate states than deactivated, active, and pending. Likewise, in some implementations, more than one DA certificate may be associated with a state. For example, in some implementations, multiple DA certificates may be assigned to the deactivated state and maintained in the domain trust with other DA certificates in other states (e.g., active, pending).

Finally, at (8), the HSM-A 104-A, returns to the device of the KMS 102 that sent the request, such as the coordinator client host, the domain token 215 as a response to the change domain request sent by the KMS at (1).

Turning now to FIG. 2B, at some time after the device of the KMS receives the domain token, at (9A), the KMS device (e.g., coordinator client host) sends the domain token to each of the HSMs 104-A, 104-B, through 104-Z. In addition, in some implementations, at (9B), the KMS device (coordinator client host) may publish, distribute to, or otherwise notify other client hosts of the KMS of the updated domain trust included in the received domain token. In other implementations, the KMS device that received the domain token may not do anything with the domain token other than send the domain token to all the HSMs. In such an implementation, the client hosts of the KMS may receive notification of the updated domain trust through other channels, as discussed below.

Returning to FIG. 2B, each HSM, in response to receiving the domain token, takes actions to independently update the domain state of the domain. For example, at (10), each HSM, in response to receipt of the domain token, decrypts, with the DKEK, the newly generated DA private key (dDA.NH) included in the domain state 211 of the updated domain token 215. Additionally, each HSM, at (11), generates a new asymmetric HSM end-entity key pair that includes an HSM end-entity public key and an HSM end-entity private key. For example, as illustrated in FIG. 2B, HSM-A 104-A generates an HSM end-entity key pair 250-A, HSM-B 104-B generates an HSM end-entity key pair 250-B, through HSM-Z 104-Z generating an HSM end-entity key pair 250-Z. Using the new HSM end-entity key pairs, each HSM, at (12), generates an HSM end-entity certificate that includes the generated HSM end-entity public key and that is signed with the active DA private key corresponding to the active DA certificate specified in the updated domain trust. In this example, the active DA private key is indicated as dDA_N and corresponds to the active DA certificate, DA_CERT_N, 204-N. In the example illustrated in FIG. 2B, HSM-A 104-A generates an HSM end-entity certificate (HSM_END-ENTITY_CERT_A) 251-A, HSM-B 104-B generates an HSM end-entity certificate (HSM_END-ENTITY_CERT_B) 251-B through HSM-Z 104-Z generating an HSM end-entity certificate (HSM_END-ENTITY_CERT_Z) 251-Z.

Each HSM, at (13), also adopts the domain trust included in the domain token as the current domain state of the domain such that each HSM is utilizing the same DA certificates with corresponding states (e.g., pending, active, deactivated) as specified in the domain trust 212 of domain token 215. In some implementations, each HSM may replace an existing domain trust and DA certificates/states with the domain trust included in the received domain token. In other implementations, each HSM may update the state of DA certificates maintained in a domain trust by that HSM, moving the previous deactivated DA certificate out of the domain trust, updating the state of the previously active DA certificate to a deactivated DA certificate, updating the state of the previously pending DA certificate to the active DA certificate, and moving the newly generated DA certificate into the domain trust and setting that newly generated DA certificate to the pending state. Regardless of whether the HSM, upon receipt of the domain token replaces the domain trust of the HSM with the domain trust included in the certificate, or updates the state of the DA certificates of the domain trust of the HSM to correspond to those specified in the domain trust of the domain token and moves certificates out/in of the domain trust of the HSM to match those of domain trust included in the domain token, the domain state of each DA certificate at each HSM is updated such that the domain trust at each HSM corresponds to the domain trust indicated in the domain token.

As noted above with respect to (9B), in some implementations, the updated domain trust 212 included in the domain token 215 may be distributed or published by the KMS 102, such as by the coordinator client host of the KMS that received the domain token, to client hosts 102-1 through 102-X. In other implementations, as each HSM 104 updates the domain state 211, as described, the HSM 104 may publish or otherwise notify client hosts communicating with the HSM of the updated domain state 212 of the domain.

Regardless of how client hosts are notified of the updated domain state or receive the updated domain trust, at (14), each client host may generate a new client host end-entity key pair, such as asymmetric keys that include a client host end-entity public key and a client host end-entity private key. Additionally, at (15), each client host requests a new/renewed client host end-entity certificate, signed by the active DA private key corresponding to the active DA certificate. For example, each client host may submit a certificate signing request ("CSR") to renew their client certificate. In some implementations, the request, such as a CSR, from a client host may include the current client host end-entity certificate signed by the now deactivated DA private key corresponding to the now deactivated DA certificate, in this example DA certificate DA_CERT_N−1 204-N−1. Because the deactivated DA certificate is still included in the domain trust, at (16), the HSM receiving the request from the client host generates a new/renewed client host end-entity certificate signed with the active private key corresponding to the active DA certificate. As discussed below, in some implementations, the HSM, as part of generating the new/renewed client host end-entity certificate, may include a lineage ID that uniquely identifies the client host, and the lineage of client host end-entity certificates issued to the client host by the distributed DA operating on the HSMs.

While the example discussed with respect to FIGS. 2A and 2B describes updating of a domain trust among a set of two or more HSMs, a similar process may be utilized to define or establish an HSM set. For example, when an HSM set of two or more HSMs is defined and intended to operate as a distributed DA, the KMS may send an initial request to an HSM of the new HSM set that the domain state be updated. In response, a receiving HSM generates a domain token, as discussed above. However, at this initial state, the generated DA keys and DA certificate may be set to an active state in the domain token so that the domain has an initial active state and corresponding active DA certificate and the domain token and included domain trust distributed as discussed above. In such an example, when a second request to update the domain state is sent from the KMS to an HSM of the HSM set, the receiving HSM may generate a new DA key pair and corresponding DA certificate and generate an updated domain trust that maintains the previously generated active DA certificate as the active DA certificate and includes the newly generated DA certificate as the pending DA certificate. Likewise, the corresponding DA keys may be maintained as the active DA keys and pending DA keys, respectively. Finally, when a third request is sent from the KMS to the HSM set to update the domain state, the process discussed above is followed, rotating the DA certificates from active to deactivated, from pending to active, and setting a newly generated DA certificate to pending.

Figure 3:
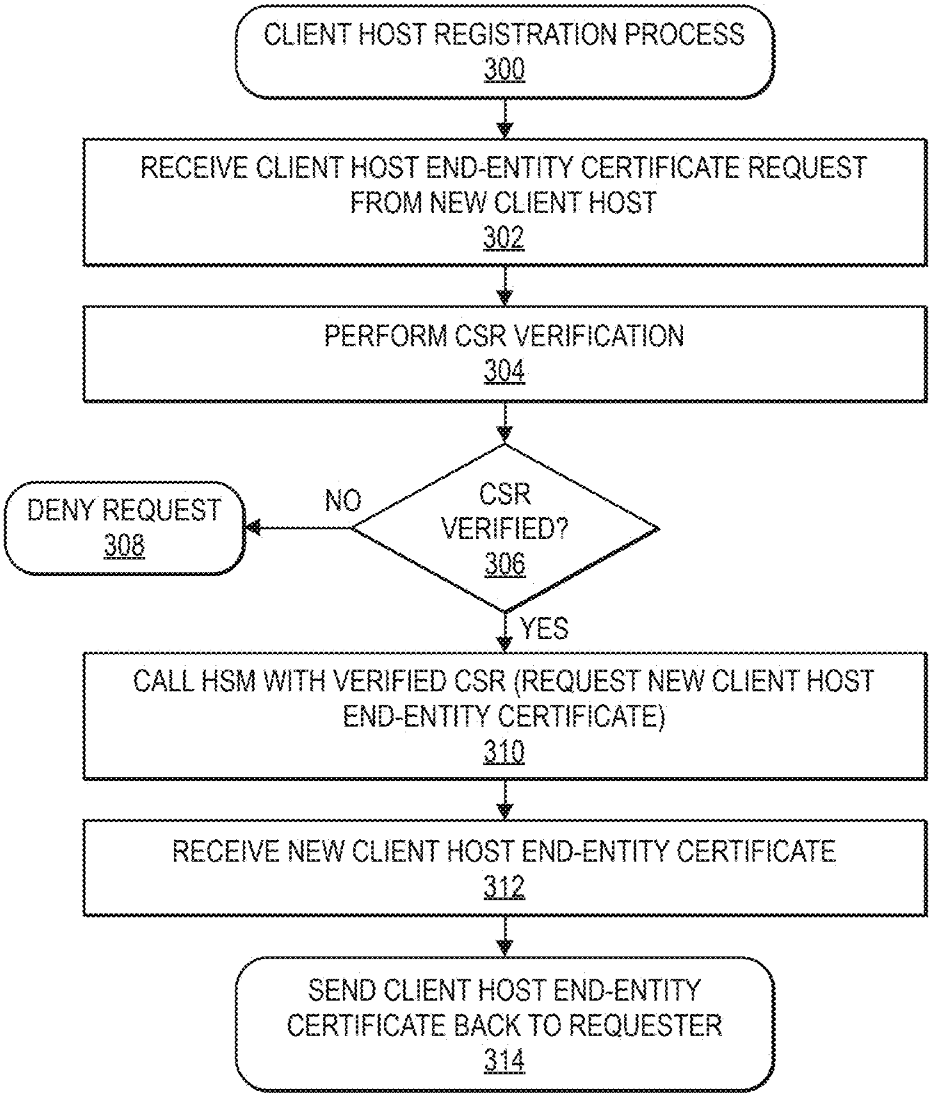
FIG. 3 is an example client host registration process, in accordance with implementations of the present disclosure.

FIG. 3 is an example client host registration process 300, in accordance with implementations of the present disclosure. The registration process 300 may be performed by the registration authority ("RA") 106 when a new client host of the KMS is to be added to the domain.

The example process 300 begins upon receipt of a client host end-entity certificate request from a new client host, as in 302. For example, a new client host may issue a CSR. As is known, a CSR typically includes a public key of the client host (client host end-entity public key) that was generated by the client host, along with other required information (e.g., client hostname, etc.). The CSR may also be signed by the client host end-entity private key corresponding to the included client host end-entity public key.

The example process 300, in response to the CSR, verifies the CSR, as in 304. Verification may include, for example, validating a CSR content against a DA semantics, wherein the DA semantics specify one or more rules, processes, or interpretations of certificates and trust relationships with a domain of the DA. Other examples of verification include, but are not limited to, verifying that an identity and access management ("IAM") role is mapped to a KMS, verifying that an IAM role session hostname is equal to a domain name system ("DNS") hostname in the CSR, verifying that an internet protocol ("IP") of the request matches an IP lookup of the DNS hostname in the CSR, verifying that the IP of the request matches a security platform subnet of a virtual private cloud ("VPC"), etc.

A determination is then made as to whether the CSR is verified, as in 306. If the CSR is not verified, the example process 300 completes, denying the request, as in 308. If the CSR is verified, an HSM of the plurality of HSMs is called with the verified CSR, thereby requesting a new client host end-entity certificate from the distributed DA for the new client host, as in 310. As with other communications with the distributed DA, the call to the DA may be sent to any HSM of the plurality of HSMs that are operating to provide the distributed DA.

In response to the call to the DA, the example process 300 receives a new client host end-entity certificate signed with the active DA private key corresponding to the active DA certificate, as in 312. Generation of a new client host end-entity certificate is discussed further below with respect to FIG. 4. Finally, the example process 300 provides the signed client host end-entity certificate back to the requesting client host, as in 314.

Figure 4:
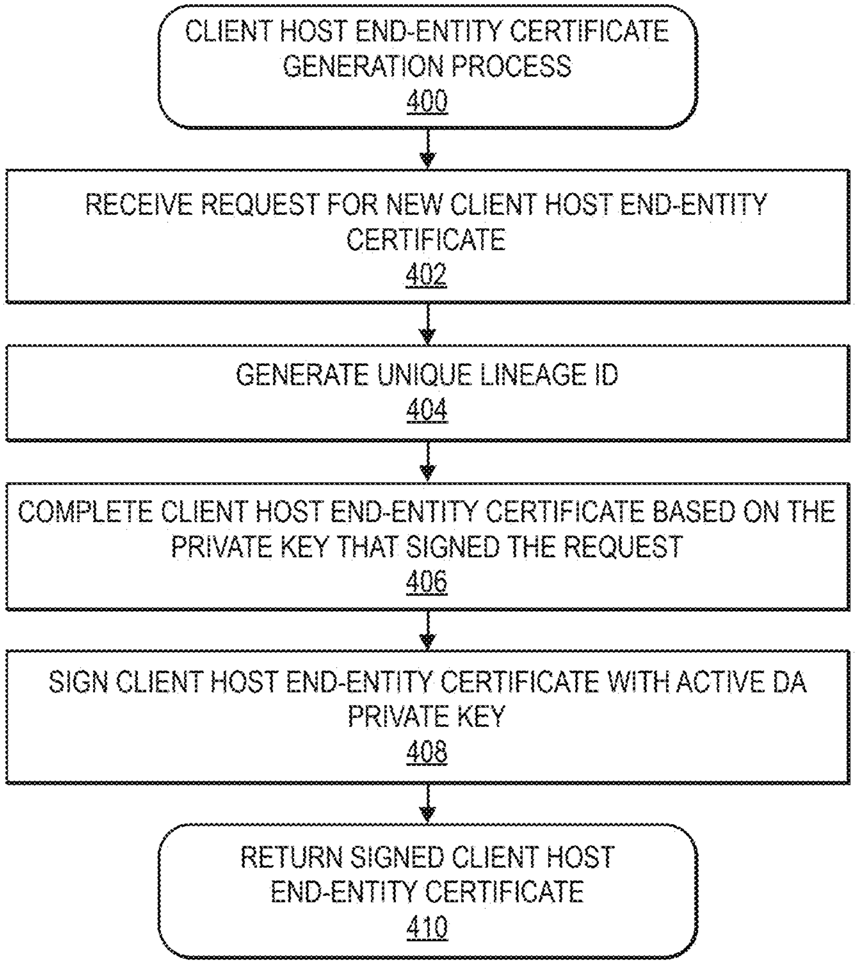
FIG. 4 is an example client host end-entity certificate generation process, in accordance with implementations of the present disclosure.

FIG. 4 is an example client host end-entity certificate generation process 400, in accordance with implementations of the present disclosure.

The example process 400 begins upon receipt of a request for a new client host end-entity certificate, as in 402. For example, as discussed above with respect to FIG. 3, the RA may make a call to the distributed DA operating on the HSMs and send a CSR signed by the private key of a new client host.

In response to a request for a new client host end-entity certificate, a unique lineage identifier ("ID") is generated that uniquely identifies the client host and that can be included in each client host end-entity certificate generated by the distributed DA for the client host. Including the lineage ID in each client host end-entity certificate generated by the distributed DA for the client host provides a direct lineage of all client host end-entity certificates issued to the client host by the distributed DA.

The client host end-entity certificate may then be completed based on the private key that signed the received request, as in 406. Completing the client host end-entity certificate may include, but is not limited to, including the public key of the client host, assigning or updating a lineage ID for the client host (discussed herein), issuer information regarding the DA, DA certificate corresponding to the DA private key signing the client host end-entity certificate, subject alternative names of the client host, key usage extensions specifying allowed uses of the client host end-entity certificate, certificate policies, etc.

After completing the client host end-entity certificate, the HSM signs the client host end-entity certificate with the active DA private key corresponding to the active DA certificate, as in 408. Finally, the signed client host end-entity certificate is returned to the requester, such as the RA or the client host, as in 410.

Figure 5:
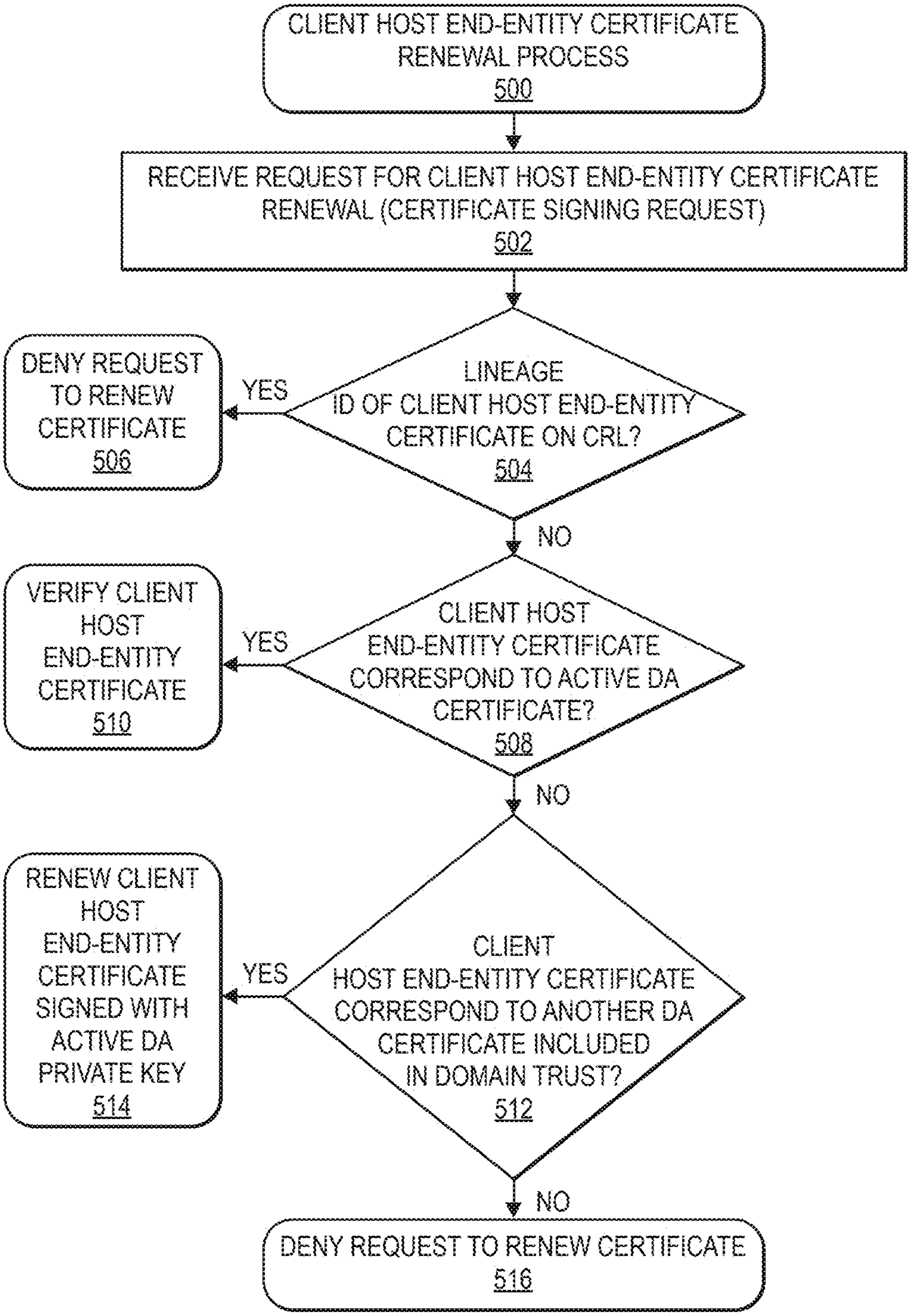
FIG. 5 is an example client host end-entity certificate renewal process, in accordance with implementations of the present disclosure.

FIG. 5 is an example client host end-entity certificate renewal process 500, in accordance with implementations of the present disclosure. The example process may be performed by the distributed DA operating on an HSM of the plurality of HSMs as part of a renewal of a client host end-entity certificate. In some implementations, the example process 500 may be automatically initiated in response to a client host of the KMS, or an agent operating on that client host receiving an updated domain trust and/or receiving a notification of a domain state change.

The example process 500 begins upon receipt of a request for client host end-entity certificate renewal, as in 502. In some implementations, the request for client host end-entity certificate renewal may be in the form of a CSR and include the current client host end-entity certificate, signed with a DA private key. In other implementations, the request may only include the client host end-entity certificate, signed with a DA private key. In still other examples, the example process 500 may be performed any time a client host communicates with the HSM to determine if the client host end-entity certificate needs to be renewed. For example, it may be determined that a client host end-entity certificate is to be renewed if it is signed with a DA private key that does not correspond to the active DA certificate or the pending DA certificate. As another example, it may be determined that the client host end-entity certificate is to be renewed if it is signed by a DA private key corresponding to the deactivated DA certificate.

Upon receipt of a request for a client host end-entity certificate renewal, a determination may be made as to whether the lineage ID of the client host end-entity certificate is included on a certificate revocation list ("CRL"), as in 504. A lineage ID of a client host end-entity certificate may be added to the CRL if, for example, the client host end-entity certificate is compromised, if the client host goes out of service, etc.

If it is determined that the lineage ID of the client host end-entity certificate is included on the CRL, the request to renew the client host end-entity certificate is denied, as in 506, and the example process 500 completes.

If it is determined that the lineage ID of the client host end-entity certificate is not included on the CRL, a determination is made as to whether the client host end-entity certificate corresponds with an active DA certificate, as in 508. For example, it may be determined that the client host end-entity certificate corresponds with an active DA certificate if the client host end-entity certificate is signed with the active DA private key corresponding to the active DA certificate.

If it is determined that the client host end-entity certificate corresponds to the active DA certificate, the client host end-entity certificate is verified as current, as in 510, and the example process 500 completes. If it is determined that the client host end-entity certificate does not correspond to the active DA certificate, a determination is made as to whether the client host end-entity certificate corresponds to another DA certificate included in the domain trust, as in 512. As discussed above, in accordance with the disclosed implementations, the domain trust may include multiple DA certificates, such as an active DA certificate, a pending DA certificate, and a deactivated DA certificate. Accordingly, if it is determined that the client host end-entity certificate does not correspond to the active DA certificate (e.g., is not signed by the active DA private key), it may be determined at decision block 512 if the client host end-entity certificate corresponds to any other DA certificate included in the domain trust (e.g., the client host end-entity certificate is signed by a DA private key corresponding to one of the other DA certificates included in the domain trust).

If it is determined that the client host does correspond to one of the other DA certificates maintained in the domain trust, the client host end-entity certificate is directly renewed by the DA operating on an HSM of the plurality of HSMs by generating a new client host end-entity certificate, updating and including the lineage ID for that client host end-entity certificate, and signing the client host end-entity certificate with the active DA private key that corresponds to the active DA certificate of the domain trust, as in 514.

If it is determined that the client host end-entity certificate does not correspond to another DA certificate included in the domain trust, the request to renew the client host end-entity certificate is denied, as in 516, and the example process 500 completes.

Figure 6A:
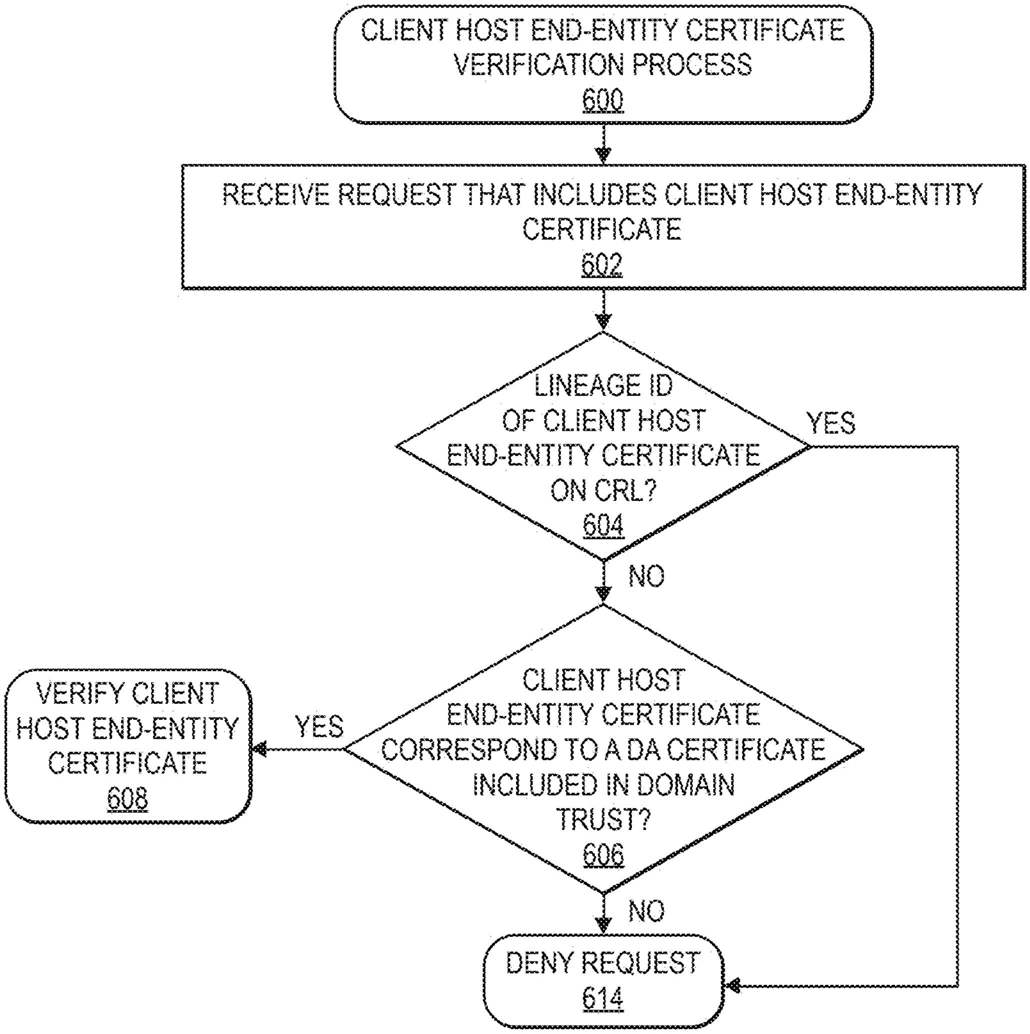
FIG. 6A is an example client host end-entity certificate verification process, in accordance with implementations of the present disclosure.

FIG. 6A is an example client host end-entity certificate verification process 600, in accordance with implementations of the present disclosure. The example process may be performed anytime a client host communicates with an HSM of the plurality of HSMs and/or communicates with the distributed DA operating on the HSMs. For example, if the client host is submitting a request for an encryption key, a request for encryption, etc., before responding to that request, the client host end-entity certificate may be verified through the example process 600.

The example process 600 begins upon receipt of a request from a client host that includes a client host end-entity certificate that is to be verified, as in 602. Upon receipt of the request, a determination may be made as to whether the lineage ID of the client host end-entity certificate is included on a CRL, as in 604. If it is determined that the lineage ID of the client host end-entity certificate is included on the CRL, the request is denied, as in 614, and the example process 600 completes.

If it is determined that the lineage ID of the client host end-entity certificate is not included on the CRL, a determination is made as to whether the client host end-entity certificate corresponds with a DA certificate included in the domain trust of the domain, as in 606. As discussed herein, in accordance with the disclosed implementations, the domain trust may include a plurality of DA certificates assigned to different states. In one example, the domain trust may include three different DA certificates with one of the DA certificates assigned to the deactivated state, one of the DA certificates assigned to the active state, and one of the DA certificates assigned to the pending state. In such an example, if the client host end-entity certificate is signed by a DA private key corresponding to any of those DA certificates included in the domain trust, it is determined at decision block 606 that the client host end-entity certificate corresponds to one of the DA certificates included in the domain trust. In other implementations, there may be additional DA certificates assigned to one or more of the states, fewer DA certificates, additional states, or fewer states.

If it is determined that the client host end-entity certificate corresponds to a DA certificate included in the domain trust, the client host end-entity certificate is verified, as in 608, and the request is responded to by the HSM. Comparatively, if it is determined that the client host end-entity certificate does not correspond to a DA certificate included in the domain trust, the request is denied, as in 614, and the example process 600 completes.

Figure 6B:
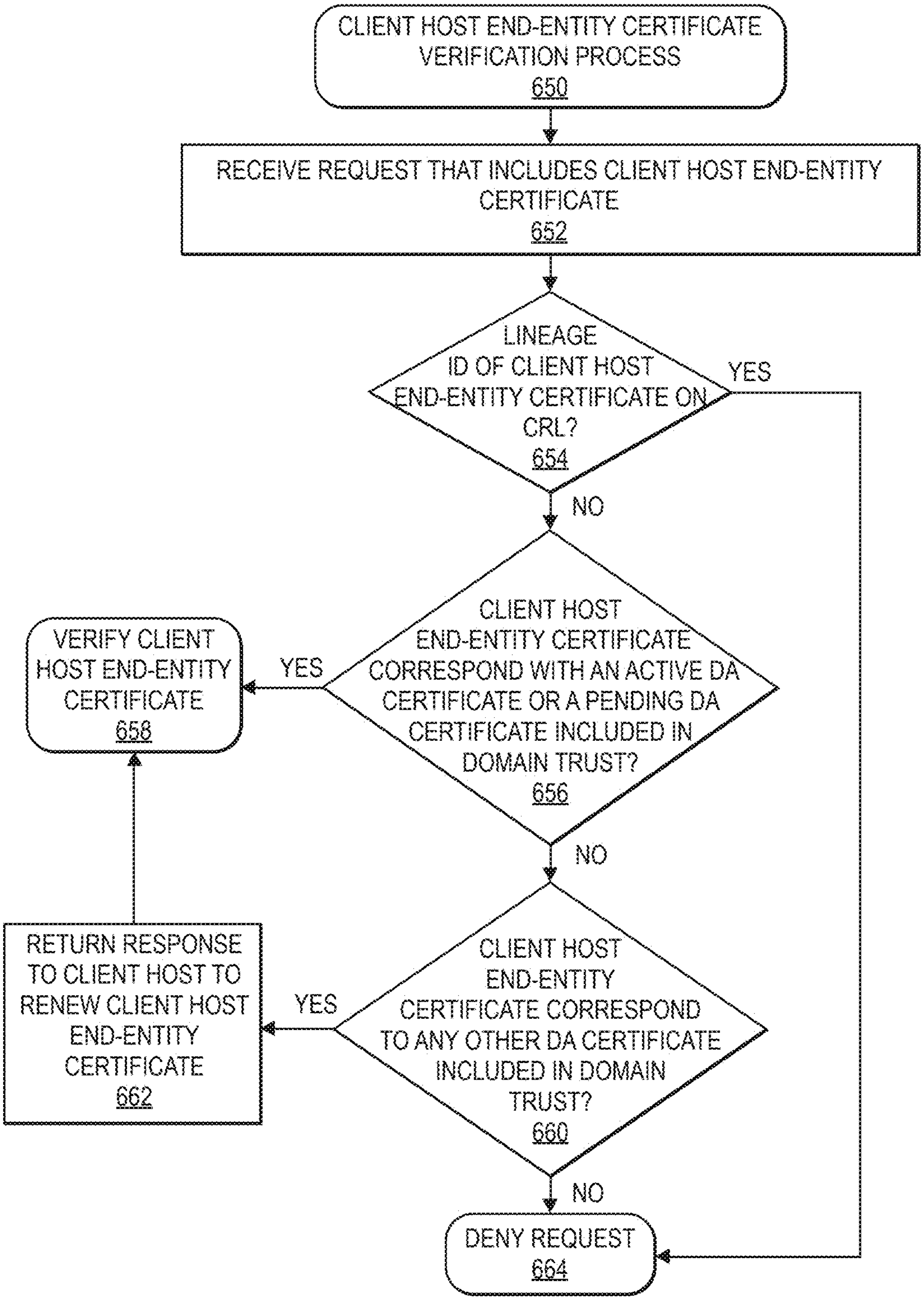
FIG. 6B is another example client host end-entity certificate verification process, in accordance with implementations of the present disclosure.

FIG. 6B is another example client host end-entity certificate verification process 650, in accordance with implementations of the present disclosure. The example process may be performed anytime a client host communicates with an HSM of the plurality of HSMs and/or communicates with the distributed DA operating on the HSMs. For example, if the client host is submitting a request for an encryption key, a request for encryption, etc., before responding to that request, the client host end-entity certificate may be verified through the example process 650.

The example process 650 begins upon receipt of a request from a client host that includes a client host end-entity certificate that is to be verified, as in 652. Upon receipt of the request, a determination may be made as to whether the lineage ID of the client host end-entity certificate is included on a CRL, as in 654. If it is determined that the lineage ID of the client host end-entity certificate is included on the CRL, the request is denied, as in 664, and the example process 650 completes.

If it is determined that the lineage ID of the client host end-entity certificate is not included on the CRL, a determination is made as to whether the client host end-entity certificate corresponds with the active DA certificate included in the domain trust of the domain or if the client host end-entity certificate corresponds with the pending DA certificate included in the domain trust, as in 656. As discussed herein, in accordance with the disclosed implementations, the domain trust may include a plurality of DA certificates assigned to different states. In one example, the domain trust may include three different DA certificates with one of the DA certificates assigned to the deactivated state, one of the DA certificates assigned to the active state, and one of the DA certificates assigned to the pending state. In other implementations, there may be additional DA certificates assigned to one or more of the states, fewer DA certificates, additional states, or fewer states. In the illustrated example, the determination is with respect to whether the client host end-entity certificate corresponds to either an active DA certificate or a pending DA certificate included in the domain trust. Such a determination may be made based on whether the client host end-entity certificate is signed with a DA private key corresponding to an active DA certificate or a pending DA certificate included in the domain trust.

If it is determined that the client host end-entity certificate corresponds to either an active DA certificate or a pending DA certificate included in the domain trust, the client host end-entity certificate is verified, as in 658, and the request is responded to by the HSM. If it is determined that the client host end-entity certificate does not correspond to either an active DA certificate or a pending DA certificate included in the domain trust, a determination may be made as to whether the client host end-entity certificate corresponds to any other DA certificate included in the domain trust, as in 660. It may be determined that the client host end-entity certificate corresponds to another DA certificate included in the domain trust if, for example, the client host end-entity certificate is signed with a DA key corresponding to another DA certificate included in the domain trust, such as a deactivated DA certificate.

If it is determined that the client host end-entity certificate does correspond to another DA certificate included in the domain trust, the example process 650 may provide a response back to the client host notifying the client host that it needs to renew the client host end-entity certificate, as in 662.

Additionally, upon determination that the client host end-entity certificate corresponds to an active DA certificate or a pending DA certificate included in the domain trust (decision block 656) or that the client host end-entity certificate corresponds to another DA certificate included in the domain trust (decision block 660), the client host end-entity certificate is verified and the received request that included the client host end-entity certificate is responded to by the HSM and/or the distributed DA operating on the HSM, as in 658.

Figure 7:
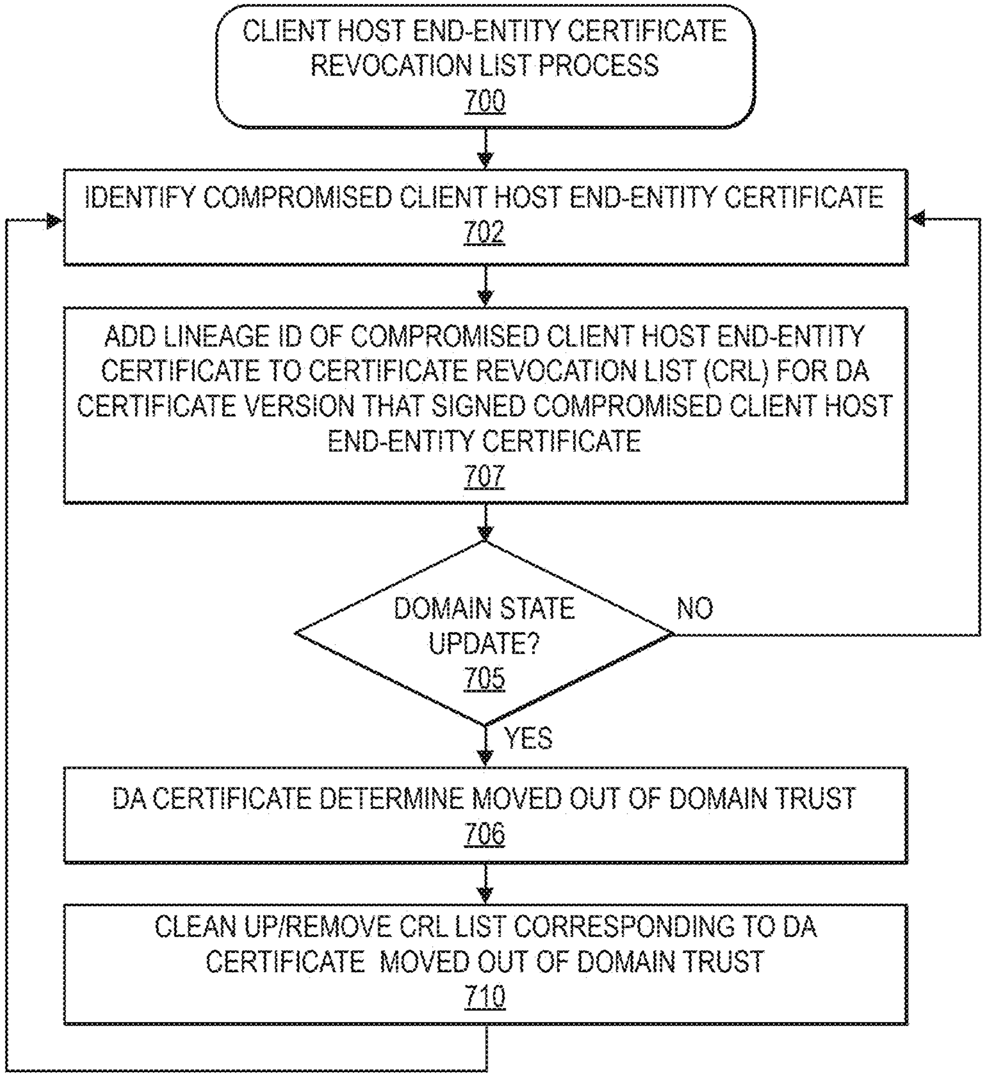
FIG. 7 is an example client host end-entity certificate revocation list process, in accordance with implementations of the present disclosure.

FIG. 7 is an example client host end-entity certificate revocation list process 700, in accordance with implementations of the present disclosure. The example process 700 may be performed each time a client host end-entity certificate is received at an HSM or distributed DA operating on an HSM.

The example process begins when a compromised client host end-entity certificate is identified, as in 702.

Upon detection of a compromised client host end-entity certificate, a lineage ID of the client host end-entity certificate is added to a CRL for a DA certificate corresponding to the private key that signed the compromised client host end-entity certificate, as in 704. In some implementations, a different CRL may be maintained for each DA certificate included in the domain trust. In other implementations, a single CRL may be maintained and the lineage ID of any compromised client host end-entity certificate added to the CRL, along with a DA certificate identifier identifying the DA certificate corresponding to the DA private key that signed the compromised client host end-entity certificate.

As discussed above, the CRL (or each CRL if multiple are maintained), may be checked each time a client host end-entity certificate is received by an HSM or a distributed DA to determine if the lineage ID is included in the CRL.

In addition to adding the lineage ID of a compromised client host end-entity certificate to the appropriate CRL, the example process 700 may determine if the domain state of the domain has been updated or changed, such as the domain trust changing, as in 705. If it is determined that the domain state has not changed, the example process 700 returns to block 702 and continues. If it is determined that the domain state of the domain has changed, it is determined which DA certificate was moved out of the domain trust as part of the domain state update, as in 706. As discussed above, with a domain state change, the domain trust may be updated to rotate DA certificates. For example, a newly generated DA certificate may be added to the DA certificate in a pending state, the DA certificate that was in the pending state may be moved to the active state, the DA certificate that was in the active state may be moved to the deactivated state, and the DA certificate in the deactivated state may be moved out of the domain trust.

Upon determination of the DA certificate having been moved out of the domain trust, the CRL list corresponding to that DA certificate is removed, as in 710. Alternatively, if there is only a single CRL list, the compromised client host end-entity certificates indicated on the CRL list corresponding to the DA certificate that has been moved out of the domain trust may be removed from the CRL list. The CRL list of a DA certificate removed from the domain trust, or removal of compromised client host lineage identifiers from a single CRL list, may be done as the client host end-entity certificate will not be validated anyway because the corresponding DA certificate is no longer included in the domain trust. Further, by removing CRL lists or removing lineage IDs from a single CRL list, keeps the CRL list(s) compact and ensure the CRL list(s) do not grow indefinitely beyond the lifetime of a DA certificate in the domain trust.

Through the use of DA certificate rotation and the CRL, client host end-entity certificate expiry is not needed as the client host end-entity certificate will automatically be revoked when the DA certificate corresponding to the DA private key that signed the client host end-entity certificate is moved out of the domain trust. As a result, the disclosed implementations prevent any client host end-entity certificate from living and staying valid forever and the revocation mechanism discussed with respect to FIG. 7 prevents any compromised client host end-entity certificate from accessing the system.

Figure 8:
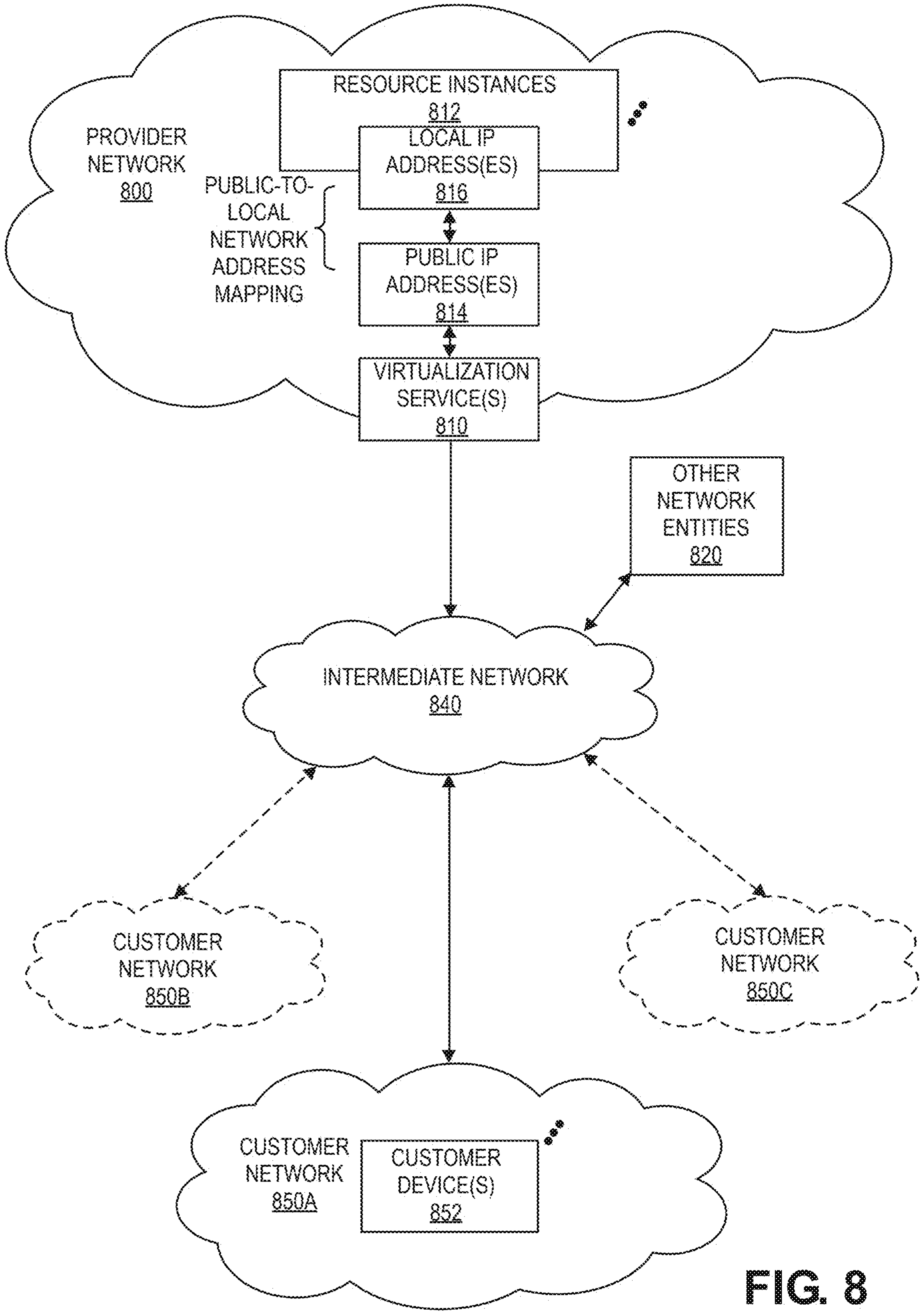
FIG. 8 illustrates an example provider network environment, according to some examples.

FIG. 8 illustrates an example provider network environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol ("IP") addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
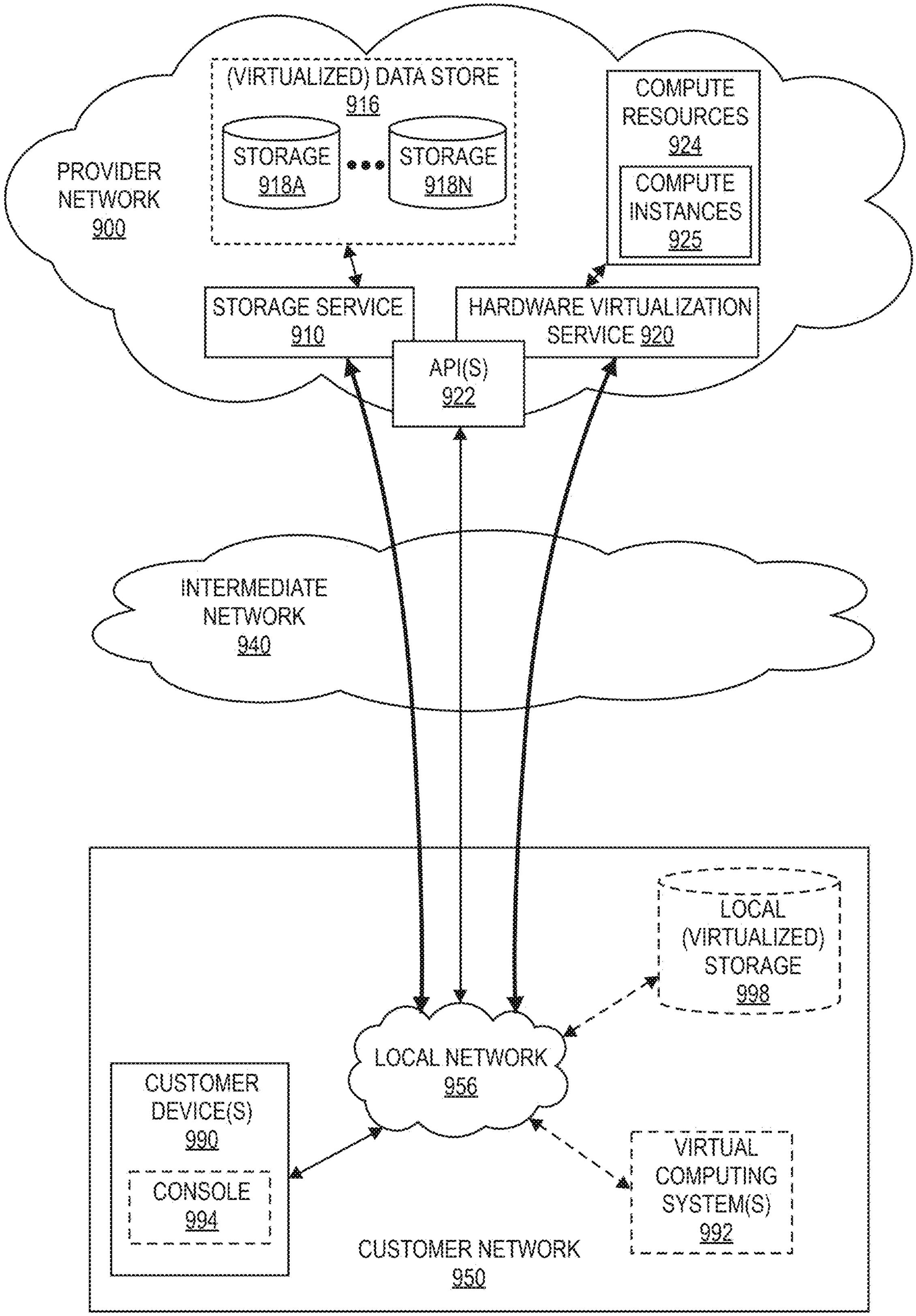
FIG. 9 is a block diagram of an example provider network that provides a storage service and a hardware virtualization service to customers according to some examples.

FIG. 9 is a block diagram of an example provider network environment 900 that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 922, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 922, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 922. For example, a customer, appliance service provider, or other entity can access a virtualization service from within a respective virtual network on the provider network 900 via the API(s) 922 to request allocation of one or more resource instances within the virtual network or within another virtual network.

Figure 10:
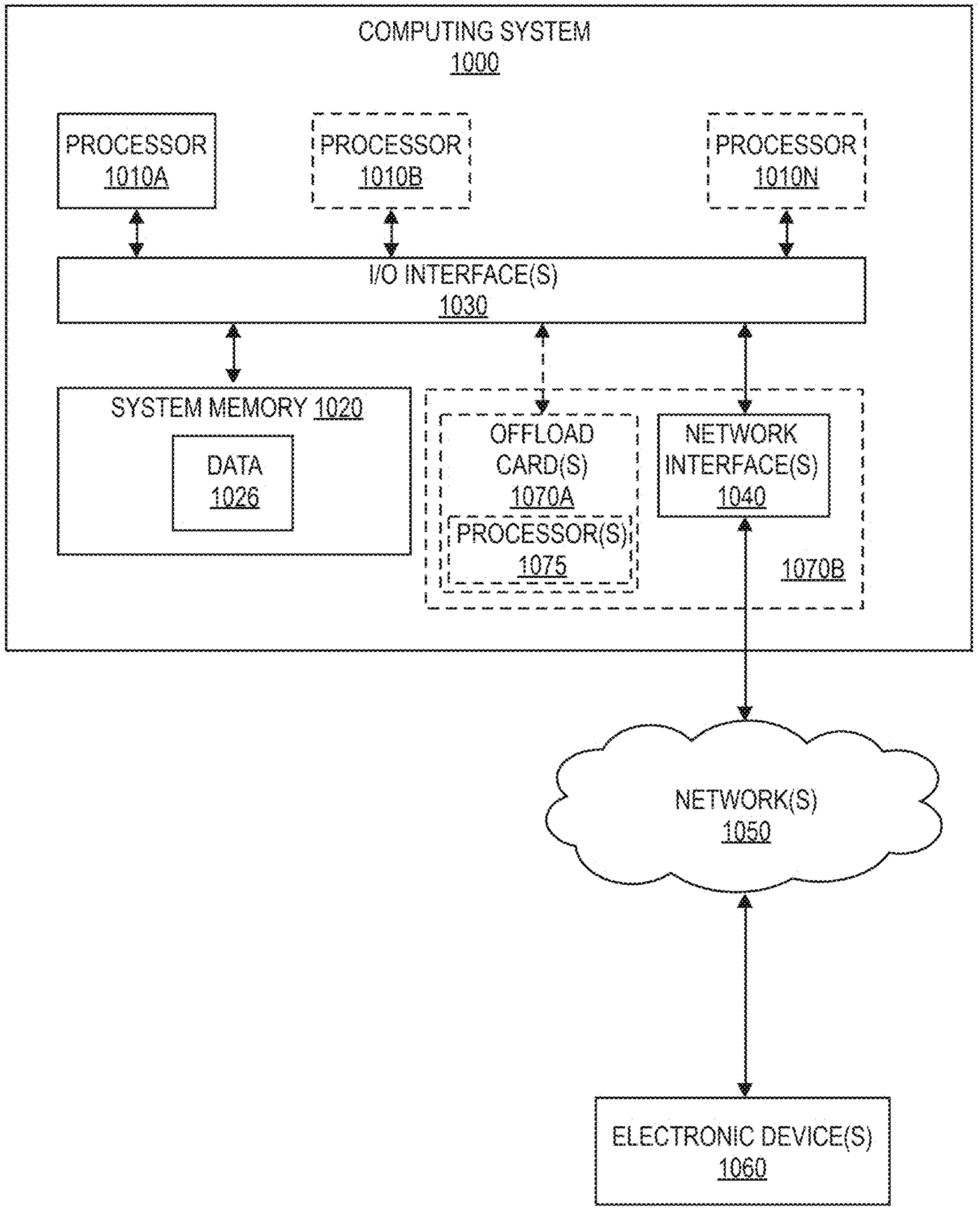
FIG. 10 is a block diagram illustrating an example computer system that can be used in some examples.

In some examples, a system that implements a portion or all of the techniques described herein can include a general-purpose computer system, such as the computer system 1000 (also referred to as a computing device or electronic device) illustrated in FIG. 10, that includes, or is configured to access, one or more computer-accessible media. In the illustrated example, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various examples the computer system 1000 can include one computing device or any number of computing devices configured to work together as a single computer system 1000.

In various examples, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices. In various examples, the network interface 1040 can support communication via any suitable wired or wireless general data networks, such as types of Ethernet networks, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A-1010N of the computer system 1000. However, in some examples the virtualization manager implemented by the offload card(s) 1070A or 1070B can accommodate requests from other entities (e.g., from compute instances themselves), and cannot coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response to requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 918A-918N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

Moreover, with respect to the one or more methods or processes of the present disclosure shown or described herein, including but not limited to the flow charts shown in FIGS. 3-7, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method, comprising:

receiving, from a first device of a key management service ("KMS") and at a first device of a plurality of hardware security modules ("HSM") operating within an HSM set, a notification to change a domain state of a domain;

in response to the notification and at the first HSM:

generating a domain authority ("DA") cryptographic key pair that includes a DA private key and a DA public key;

generating a DA certificate that includes the DA public key, signed by the first HSM with the DA private key;

generating a domain token that includes:

a domain state that includes the DA private key encrypted with a domain key encryption key ("DKEK") that is known to each of the plurality of HSMs; and a domain trust that includes the DA certificate; and returning the domain token to the KMS;

receiving, at each of the plurality of HSMs and from the KMS, the domain token;

at each HSM of the plurality of HSMs and in response to receiving the domain token:

setting the DA certificate as an active DA state;

generating an HSM cryptographic key pair that includes an HSM end-entity private key and an HSM end-entity public key; and generating a new HSM end-entity certificate that includes the HSM end-entity public key and that is signed by the DA private key;

at a second HSM of the plurality of HSMs:

receiving, from a client host of the KMS, a certificate signing request ("CSR") for a client host end-entity certificate; and in response to the CSR:

generating a signed client host end-entity certificate signed with the DA private key; and returning, to the client host, the signed client host end-entity certificate.

2. The computer-implemented method of claim 1, wherein the second HSM, in response to receiving the CSR, further performs the computer-implemented method, comprising:

determining that the CSR corresponds to a renewal of a current client host end-entity certificate, wherein:

the CSR is generated in response to a change in the domain state, and the CSR includes the current client host end-entity certificate; and including a lineage identifier ("ID") corresponding to the current client host end-entity certificate in the signed client host end-entity certificate.

3. The computer-implemented method of claim 1, wherein the second HSM, in response to receiving the CSR, further performs the computer-implemented method, comprising:

determining that the CSR corresponds to a new client host;

generating a unique lineage identifier ("ID") that uniquely identifies the new client host; and including the unique lineage ID in the signed client host end-entity certificate.

4. The computer-implemented method of claim 1, further comprising:

at each HSM of the plurality of HSMs and in response to receiving the domain token:

setting a second DA certificate to deactivated; and setting the DA certificate to active.

5. The computer-implemented method of claim 4, further comprising:

subsequent to setting the DA certificate to active, receiving, at the second HSM, a request to verify a second client host end-entity certificate signed by a private key corresponding to the second DA certificate; and verifying the second client host end-entity certificate.

6. A system, comprising:

a plurality of client hosts of a key management service ("KMS");

a plurality of hardware security modules ("HSM"), each of the plurality of HSMs operating as a distributed domain authority ("DA"); and at a first HSM of the plurality of HSMs:

determine that a DA state is to be updated;

in response to determination that the DA state is to be updated:

generate a DA cryptographic key pair that includes a DA private key and a DA public key;

generate a DA certificate that includes the DA public key and that is signed by the DA private key;

generate a domain token that includes:

a domain state that includes the DA private key and that is encrypted with a domain key encryption key ("DKEK") that is known to each of the plurality of HSMs; and a domain trust that includes the DA certificate; and send the domain token to the KMS;

at the KMS and in response to receipt of the domain token, send the domain token to at least a second HSM of the plurality of HSMs; and at the second HSM and in response to receipt of the domain token:

decrypt the DKEK encrypted DA private key with the DKEK;

set the DA certificate as active;

generate a signed client host end-entity certificate signed by the DA private key; and return, to a client host of the plurality of client hosts, the signed client host end-entity certificate.

7. The system of claim 6, wherein:

the KMS is further configured to at least, in response to receipt of the domain token, send the domain token to at least the first HSM and the second HSM; and the first HSM is further configured to at least, in response to the domain token:

decrypt the DKEK encrypted private key with the DKEK; and set the DA certificate to active.

8. The system of claim 6, wherein the first HSM is further configured to at least:

in response to determination that the DA state is to be updated, set the DA certificate to active.

9. The system of claim 8, wherein the second HSM is further configured to at least:

generate an HSM cryptographic key pair that includes an HSM end-entity private key and an HSM end-entity public key; and generating a new HSM end-entity certificate that includes the HSM end-entity public key and that is signed by the DA private key.

10. The system of claim 6, further comprising:

a registration authority, the registration authority configured to at least:

receive a certificate signing request ("CSR") from a new client host that is to be added to the plurality of client hosts;

complete a CSR verification to verify a client host end-entity certificate of the new client host;

send, to a third HSM of the plurality of HSMs, the client host end-entity certificate with a request that the client host end-entity certificate be signed;

receive, from the third HSM, a signed client host end-entity certificate, signed with the DA private key; and return the signed client host end-entity certificate to the new client.

11. The system of claim 10, wherein the signed client host end-entity certificate includes a unique lineage identifier ("ID") for the signed client host end-entity certificate.

12. The system of claim 10, wherein completion of the CSR verification includes, at least one of:

validating a CSR content against a DA semantics, wherein the DA semantics specify one or more rules, processes, or interpretations of certificates and trust relationships with a domain of the DA;

verifying that an identity and access management ("IAM") role is mapped to a KMS;

verifying that an IAM role session hostname is equal to a domain name system ("DNS") hostname in the CSR;

verifying that an internet protocol ("IP") of the request matches an IP lookup of the DNS hostname in the CSR; or verifying that the IP of the request matches a security platform subnet of a virtual private cloud ("VPC").

13. The system of claim 6, wherein:

the plurality of HSMs include a third HSM that is at least one of a new HSM to the plurality of HSMs or a rebooted HSM of the plurality of HSMs; and the third HSM is further configured to at least, in response to receipt of the domain token:

decrypt the DKEK encrypted DA private key with the DKEK;

set the DA certificate as active;

generate an HSM cryptographic key pair that includes an HSM end-entity private key and an HSM end-entity public key; and generate a new HSM end-entity certificate that includes the HSM end-entity public key and that is signed by the DA private key.

14. The system of claim 6, wherein:

the first HSM is further configured to at least:

receive a first request from a first client host for a first client host end-entity certificate; and in response to the first request, generate a first signed client host end-entity certificate, signed by the first HSM with the DA private key; and the second HSM is further configured to at least:

receive a second request from a second client host for a second client host end-entity certificate; and in response to the second request, generate a second signed client host end-entity certificate, signed by the second HSM with the DA private key.

15. The system of claim 6, wherein the second HSM is further configured to at least:

receive a first request to verify a signed first client host end-entity certificate;

determine that the signed first client host end-entity certificate is signed with a deactivated DA private key corresponding to a deactivated DA certificate;

verify the signed first client host end-entity certificate;

receive a second request to verify a signed second client host end-entity certificate;

determine that the signed second client host end-entity certificate is signed with an active DA private key corresponding to an active DA certificate; and verify the signed second client host end-entity certificate.

16. The system of claim 13, wherein the second HSM is further configured to at least:

receive a third request to verify a signed third client host end-entity certificate;

determine that the signed third client host end-entity certificate is signed with a second DA private key corresponding to a second DA certificate that has been moved out of a domain trust; and deny the signed third client host end-entity certificate.

17. A system, comprising:

a plurality of hardware security modules ("HSMs") operating within an HSM set and configured to each operate as a domain authority ("DA") for a domain, thereby providing a distributed DA for the domain;

at a first HSM of the plurality of HSMs:

generate a DA cryptographic key pair that includes a DA private key and a DA public key;

generate a DA certificate that includes the DA public key, signed by the first HSM with the DA private key;

generate a domain token that includes:

a domain state that includes the DA private key and that is encrypted with a domain key encryption key ("DKEK") that is known to each of the plurality of HSMs; and a domain trust that includes the DA certificate; and send the domain token to a device that is external of the HSM set;

receive, at a second HSM of the plurality of HSMs and from the device that is external of the HSM set, the domain token; and in response to receipt of the domain token, at the second HSM:

decrypt the DKEK encrypted DA private key with the DKEK; and set the DA certificate as active, such that both the first HSM and the second HSM include the DA private key and the DA certificate.

18. The system of claim 17, wherein the first HSM is further configured to at least:

receive, at the first HSM and from the device that is external of the HSM set, the domain token; and in response to receipt of the domain token, at the first HSM:

decrypt the DKEK encrypted DA private key with the DKEK; and set the DA certificate as active, such that both the first HSM and the second HSM include the DA private key and the DA certificate.

19. The system of claim 17, wherein:

the first HSM is further configured to at least:

receive a first certificate signing request ("CSR") from a first client host that is external of the HSM set; and in response to the first CSR:

determine that the first CSR corresponds to a renewal of a signed first client host end-entity certificate;

generate a signed updated first client host end-entity certificate, signed by the first HSM and with the DA private key; and return, from the first HSM, the signed updated first client host end-entity certificate; and the second HSM is further configured to at least:

receive a second CSR from a second client host that is external of the HSM set; and in response to the second CSR:

determine that the second CSR corresponds to a renewal of a signed second client host end-entity certificate;

generate a signed updated second client host end-entity certificate, signed by the second HSM with the DA private key; and return, from the second HSM, the signed updated second client host end-entity certificate.

20. The system of claim 17, wherein the second HSM is further configured to at least:

receive, from a second device that is external of an HSM set, a request to verify a second device certificate;

determine that a lineage identifier included in the second device certificate is indicated on a revocation list; and in response to determination that the lineage identifier is included on the revocation list, deny the second device certificate.

* * * * *